United States Patent
Chuang et al.

(10) Patent No.: US 10,469,852 B2
(45) Date of Patent: Nov. 5, 2019

(54) METHOD AND APPARATUS OF INTERLAYER TEXTURE PREDICTION

(71) Applicant: MediaTek Inc., Hsin-Chu (TW)

(72) Inventors: Tzu-Der Chuang, Zhubei (TW); Zhenzhong Chen, San Jose, CA (US); Shan Liu, San Jose, CA (US); Ching-Yeh Chen, Taipei (TW); Chih-Wei Hsu, Hsinchu (TW)

(73) Assignee: MediaTek Inc., Hsin-Chu (TW)

( * ) Notice: Subject to any disclaimer, the term of this patent is extended or adjusted under 35 U.S.C. 154(b) by 547 days.

(21) Appl. No.: 14/422,051

(22) PCT Filed: Jul. 30, 2013

(86) PCT No.: PCT/CN2013/080415
§ 371 (c)(1),
(2) Date: Feb. 17, 2015

(87) PCT Pub. No.: WO2014/029261
PCT Pub. Date: Feb. 27, 2014

(65) Prior Publication Data
US 2015/0222912 A1 Aug. 6, 2015

Related U.S. Application Data (60) Provisional application No. 61/692,438, filed on Aug. 23, 2012.

(51) Int. Cl.
*H04N 19/187* (2014.01)
*H04N 19/463* (2014.01)
(Continued)

(52) U.S. Cl.
CPC ......... *H04N 19/187* (2014.11); *H04N 19/176* (2014.11); *H04N 19/31* (2014.11);
(Continued)

(58) Field of Classification Search
CPC .... H04N 19/187; H04N 19/176; H04N 19/31; H04N 19/33; H04N 19/36; H04N 19/463; H04N 19/50; H04N 19/70
See application file for complete search history.

(56) References Cited

U.S. PATENT DOCUMENTS

| | | | |
|---|---|---|---|
| 9,762,918 B2 * | 9/2017 | Chuang | H04N 19/102 |
| 2006/0153295 A1 * | 7/2006 | Wang | H04N 19/159 |
| | | | 375/240.08 |

(Continued)

FOREIGN PATENT DOCUMENTS

| | | |
|---|---|---|
| CN | 101572817 | 11/2009 |
| EP | 1 021 043 | 7/2000 |

(Continued)

OTHER PUBLICATIONS

Misra et al., "New results for periodic inits for wavefront coding functionality", Joint Collaborative Team on Video Coding (JCT-VC) of ITU-T SG16 WP3 and ISO/IEC JTC1/SC29/WG11. 5th Meeting: Geneva, CH, Mar. 16-23, 2011.*

(Continued)

*Primary Examiner* — William C Vaughn, Jr.
*Assistant Examiner* — Joseph Daniel A Towe
(74) *Attorney, Agent, or Firm* — Wolf, Greenfield & Sacks, P.C.

(57) ABSTRACT

A method and apparatus for coding video data in a scalable or three-dimensional video coding system are disclosed. In one embodiment, context for the input data associated with an inter-layer or inter-view coding syntax element of a current block in an enhancement-layer (EL) or a dependent view is formed or the input data is parsed to identify the context based on information associated with one or more neighboring blocks, information associated with the current block, or both. In another embodiment, encoding or decoding is applied to the input data associated with the current block in the EL using inter-layer texture prediction based on the BL block in the BL, wherein a flag indicating whether there is any transform coefficient coded for the current block is signaled.

19 Claims, 5 Drawing Sheets

(51) Int. Cl.
*H04N 19/33* (2014.01)
*H04N 19/36* (2014.01)
*H04N 19/176* (2014.01)
*H04N 19/31* (2014.01)
*H04N 19/50* (2014.01)
*H04N 19/70* (2014.01)

(52) U.S. Cl.
CPC ............. *H04N 19/33* (2014.11); *H04N 19/36* (2014.11); *H04N 19/463* (2014.11); *H04N 19/50* (2014.11); *H04N 19/70* (2014.11)

(56) References Cited

U.S. PATENT DOCUMENTS

| | | | |
|---|---|---|---|
| 2008/0165850 A1 | 7/2008 | Sagetong et al. | |
| 2009/0147848 A1* | 6/2009 | Park | H04N 19/103 375/240.13 |

FOREIGN PATENT DOCUMENTS

| | | | | |
|---|---|---|---|---|
| EP | 1021043 A2 * | 7/2000 | ........... | H04N 19/649 |
| WO | WO 2006/075901 | 7/2006 | | |
| WO | WO 2006075901 A1 * | 7/2006 | ........... | H04N 19/176 |
| WO | WO 2007/008018 | 1/2007 | | |
| WO | WO 2007008018 A1 * | 1/2007 | ............. | H04N 19/70 |
| WO | WO-2007008018 A1 * | 1/2007 | ............. | H04N 19/70 |
| WO | WO 2007/081178 | 7/2007 | | |
| WO | WO 2013/139212 | 9/2013 | | |

OTHER PUBLICATIONS

Chien et al., "Context reduction for CABAC", Joint Collaborative Team on Video Coding (JCT-VC) of ITU-T SG16 WP3 and ISO/IEC JTC1/SC29/WG11. 7th Meeting: Geneva, Nov. 21-30, 2011.*
International Search Report dated Nov. 7, 2013.
English language translation of abstract of CN 101572817 (published Nov. 4, 2009).
Misra, K., et al.; "New results for periodic inits for wavefront coding functionality;" Joint Collaborative Team on Video Coding (JCT-VC) of ITU-T SG 16 WP3 and ISO/IEC JTC1/SC29/WG11; Mar. 2011; pp. 1-3.
Chien, W.J., et al.; "Context reduction for CABAC;" Joint Collaborative Team on Video Coding (JCT-VC) of ITU-T SG 16 WP3 and ISO/IEC JTC1/SC29/WG11; Nov. 2011; pp. 1-8.
Marpe, D., et al.; "Context-based adaptive binary arithmetic coding in the H.264/AVC Video Compression Standard;" IEEE Transactions on Circuits and Systems for Video Technology; vol. 13; No. 7; Jul. 2003; pp. 620-636.
Written Opinion dated Nov. 7, 2013 in connection with International Application No. PCT/CN2013/080415.
Wang Q., Fast intra-frame prediction algorithm for 4×4 block in H.264, Computer Engineering, Jan. 2010, vol. 36, No. 2, p. 218.

* cited by examiner

METHOD AND APPARATUS OF INTERLAYER TEXTURE PREDICTION

CROSS REFERENCE TO RELATED APPLICATIONS

The present invention is a National Phase Application of PCT Ser. No. PCT/CN2013/080415, filed on Jul. 30, 2013, which claims priority to U.S. Provisional Patent Application Ser. No. 61/692,438, filed Aug. 23, 2012, entitled "Coding of Inter-layer Texture Prediction," the entireties of which are incorporated by reference herein.

FIELD OF INVENTION

The present invention relates to video coding. In particular, the present invention relates to scalable video coding that utilizes inter-layer prediction.

BACKGROUND OF THE INVENTION

Compressed digital video has been widely used in various applications such as video streaming over digital networks and video transmission over digital channels. Very often, a single video content may be delivered over networks with different characteristics. For example, a live sport event may be carried in a high-bandwidth streaming format over broadband networks for premium video service. In such applications, the compressed video usually preserves high resolution and high quality so that the video content is suited for high-definition devices such as an HDTV or a high resolution LCD display. The same content may also be carried through cellular data network so that the content can be watch on a portable device such as a smart phone or a network-connected portable media device. In such applications, due to the network bandwidth concerns as well as the typical low-resolution display on the smart phone or portable devices, the video content usually is compressed into lower resolution and lower bitrates. Therefore, for different network environment and for different applications, the video resolution and video quality requirements are quite different. Even for the same type of network, users may experience different available bandwidths due to different network infrastructure and network traffic condition. Therefore, a user may desire to receive the video at higher quality when the available bandwidth is high and receive a lower-quality, but smooth, video when the network congestion occurs. In another scenario, a high-end media player can handle high-resolution and high bitrate compressed video while a low-cost media player is only capable of handling low-resolution and low bitrate compressed video due to limited computational resources. Accordingly, it is desirable to construct the compressed video in a scalable manner so that videos at different spatial-temporal resolution and/or quality can be derived from the same compressed bitstream.

The joint video team (JVT) of ISO/IEC MPEG and ITU-T VCEG standardized a Scalable Video Coding (SVC) extension of the H.264/AVC standard. An H.264/AVC SVC bitstream can contain video information from low frame-rate, low resolution, and low quality to high frame rate, high definition, and high quality. This single bitstream can be adapted to various applications and displayed on devices with different configurations. Accordingly, H.264/AVC SVC is suitable for various video applications such as video broadcasting, video streaming, and video surveillance to adapt to network infrastructure, traffic condition, user preference, and etc.

In SVC, three types of scalabilities, i.e., temporal scalability, spatial scalability, and quality scalability, are provided. SVC uses multi-layer coding structure to realize the three dimensions of scalability. A main goal of SVC is to generate one scalable bitstream that can be easily and rapidly adapted to the bit-rate requirement associated with various transmission channels, diverse display capabilities, and different computational resources without trans-coding or re-encoding. An important feature of the SVC design is that the scalability is provided at a bitstream level. In other words, bitstreams for deriving video with a reduced spatial and/or temporal resolution can be simply obtained by extracting Network Abstraction Layer (NAL) units (or network packets) from a scalable bitstream that are required for decoding the intended video. NAL units for quality refinement can be additionally truncated in order to reduce the bit-rate and the associated video quality.

Figure 1:
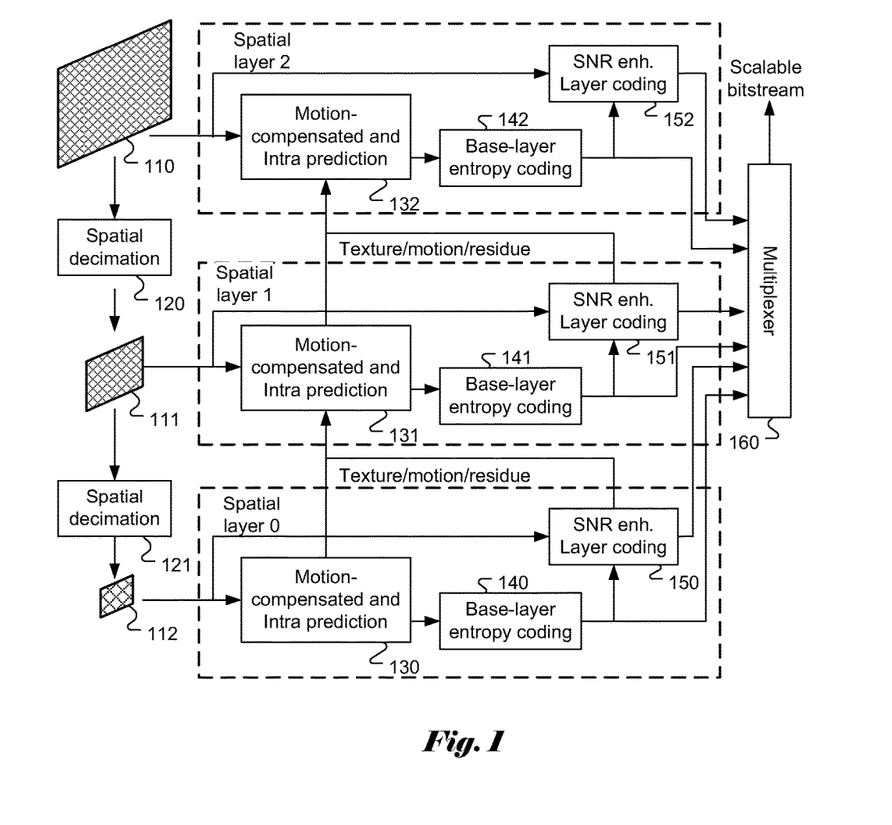
FIG. 1 illustrates an example of a scalable video coding system that provides spatial scalability as well as quality scalability, where three spatial layers are provided.

In SVC, spatial scalability is supported based on the pyramid coding scheme as shown in FIG. 1. In a SVC system with spatial scalability, the video sequence is first down-sampled to obtain smaller pictures at different spatial resolutions (layers). For example, picture 110 at the original resolution can be processed by spatial decimation 120 to obtain resolution-reduced picture 111. The resolution-reduced picture 111 can be further processed by spatial decimation 121 to obtain further resolution-reduced picture 112 as shown in FIG. 1. In addition to dyadic spatial resolution, where the spatial resolution is reduced to half in each level, SVC also supports arbitrary resolution ratios, which is called extended spatial scalability (ESS). The SVC system in FIG. 1 illustrates an example of spatial scalable system with three layers, where layer 0 corresponds to the pictures with lowest spatial resolution and layer 2 corresponds to the pictures with the highest resolution. The layer-0 pictures are coded without reference to other layers, i.e., single-layer coding. For example, the lowest layer picture 112 is coded using motion-compensated and Intra prediction 130.

The motion-compensated and Intra prediction 130 will generate syntax elements as well as coding related information such as motion information for further entropy coding 140. FIG. 1 actually illustrates a combined SVC system that provides spatial scalability as well as quality scalability (also called SNR scalability). The system may also provide temporal scalability, which is not explicitly shown. For each single-layer coding, the residual coding errors can be refined using SNR enhancement layer coding 150. The SNR enhancement layer in FIG. 1 may provide multiple quality levels (quality scalability). Each supported resolution layer can be coded by respective single-layer motion-compensated and Intra prediction like a non-scalable coding system. Each higher spatial layer may also be coded using inter-layer coding based on one or more lower spatial layers. For example, layer 1 video can be adaptively coded using inter-layer prediction based on layer 0 video or a single-layer coding on a macroblock by macroblock basis or other block unit. Similarly, layer 2 video can be adaptively coded using inter-layer prediction based on reconstructed layer 1 video or a single-layer coding. As shown in FIG. 1, layer-1 pictures 111 can be coded by motion-compensated and Intra prediction 131, base layer entropy coding 141 and SNR enhancement layer coding 151.

As shown in FIG. 1, the reconstructed BL video data is also utilized by motion-compensated and Intra prediction 131, where a coding block in spatial layer 1 may use the reconstructed BL video data as an additional Intra prediction data (i.e., no motion compensation is involved). Similarly, layer-2 pictures 110 can be coded by motion-compensated and Intra prediction 132, base layer entropy coding 142 and SNR enhancement layer coding 152. The BL bitstreams and SNR enhancement layer bitstreams from all spatial layers are multiplexed by multiplexer 160 to generate a scalable bitstream. The coding efficiency can be improved due to inter-layer coding. Furthermore, the information required to code spatial layer 1 may depend on reconstructed layer 0 (inter-layer prediction). A higher layer in an SVC system is referred as an enhancement layer. The H.264 SVC provides three types of inter-layer prediction tools: inter-layer motion prediction, inter-layer Intra prediction, and inter-layer residual prediction.

In SVC, the enhancement layer (EL) can reuse the motion information in the base layer (BL) to reduce the inter-layer motion data redundancy. For example, the EL macroblock coding may use a flag, such as base_mode_flag before mb_type is determined to indicate whether the EL motion information is directly derived from the BL. If base_mode_flag is equal to 1, the partitioning data of the EL macroblock along with the associated reference indexes and motion vectors are derived from the corresponding data of the collocated 8×8 block in the BL. The reference picture index of the BL is directly used in the EL. The motion vectors of the EL are scaled from the data associated with the BL. Besides, the scaled BL motion vector can be used as an additional motion vector predictor for the EL.

Inter-layer residual prediction uses the up-sampled BL residual information to reduce the information required for coding the EL residuals. The collocated residual of the BL can be block-wise up-sampled using a bilinear filter and can be used as prediction for the residual of a corresponding macroblock in the EL. The up-sampling of the reference layer residual is done on transform block basis in order to ensure that no filtering is applied across transform block boundaries.

Similar to inter-layer residual prediction, the inter-layer Intra prediction reduces the redundant texture information of the EL. The prediction in the EL is generated by block-wise up-sampling the collocated BL reconstruction signal. In the inter-layer Intra prediction up-sampling procedure, 4-tap and 2-tap FIR filters are applied for luma and chroma components, respectively. Different from inter-layer residual prediction, filtering for the inter-layer Intra prediction is always performed across sub-block boundaries. For decoding simplicity, inter-layer Intra prediction can be applied only to the intra-coded macroblocks in the BL.

It is desirable to further improve the coding efficiency of scalable video coding systems.

SUMMARY OF THE INVENTION

A method and apparatus for coding video data in a scalable video coding system are disclosed, where the video data is configured into a Base Layer (BL) and an Enhancement Layer (EL), and the EL has higher spatial resolution or better video quality than the BL. In one embodiment according to the present invention, input data associated with an inter-layer coding syntax element of a current block in the EL is received. Context for the input data is formed or the input data is parsed to identify the context based on supporting information, wherein the supporting information corresponds to first information associated with one or more neighboring blocks of the current block, second information associated with the current block, or both the first information and the second information. After the context is formed or parsed, the input data is encoded or decoded according to the context. The neighboring blocks may include an upper block and a left block of the current block, or a left block of the current block only. In an embodiment, if the upper block is not in a same Largest Coding Unit (LCU) row as the current block, the first information only includes the first information associated with the left block or the first information corresponds to a predefined value. The inter-layer coding syntax element may correspond to various flags associated with inter-layer prediction configurations or parameters. The second information associated with the current block may include depth, block width, or block height of current block, or any combination thereof.

In another embodiment of the present invention, the input data associated with a current block in the EL is received. An EL Intra prediction mode for the current block in the EL is determined based on one or more BL Intra prediction modes from the BL. Intra prediction encoding or decoding is then applied to the input data according to the EL Intra prediction mode. If a neighboring block of the current block is an inter-layer texture prediction coded block, the BL Intra prediction mode corresponding to the neighboring block is used for Intra prediction Most Probable Mode (MPM) derivation, wherein the MPM is used for coding the EL Intra prediction mode. The current block may include smallest units (SUs) and the SUs in the current block may use different Intra prediction modes. In this case, each of the SUs in the current block uses the same Intra prediction mode as a collocated SU in the BL. According to one embodiment, if the current block corresponds to two or more BL blocks and said two or more BL blocks have different BL Intra prediction modes, only one EL Intra prediction mode is used by the current block. In one embodiment, mode dependent transform and mode dependent coefficient scan are used in the Intra prediction encoding or decoding of the input data.

In yet another embodiment of the present invention, the input data associated with a current block in the EL is received. A BL block in the BL corresponding to the current block in the EL is determined. Encoding or decoding is applied to the input data associated with the current block in the EL using inter-layer texture prediction based on the BL block in the BL, wherein a flag indicating whether there is any transform coefficient coded for the current block is signaled.

In yet another embodiment according to the present invention, context formation is applied to a three-dimensional or multi-view video coding system. Context for the input data is formed or the input data is parsed to identify the context based on supporting information for an inter-view coding syntax element of a current block in one dependent view. The supporting information corresponds to first information associated with one or more neighboring blocks of the current block, second information associated with the current block, or both the first information and the second information. After the context is formed or parsed, the input data is encoded or decoded according to the context. The neighboring blocks may include an upper block and a left block of the current block, or a left block of the current block only.

DETAILED DESCRIPTION

In order to improve the coding efficiency for a scalable coding system, one embodiment of the present invention utilizes context adaptive coding for syntax elements for indicating various coding controls, configurations or parameters, such as the inter-layer texture prediction flag, inter-layer differential coding flag, and inter-layer residual prediction flag. In the conventional SVC system based on HEVC, the inter-layer texture prediction flag, inter-layer differential coding flag, and inter-layer residual prediction flag are coded in a non-adaptive manner. In other words, only one context is used for each of these syntax elements. Embodiments according to the present invention form context based on neighboring information and/or current block information. For example, the neighboring information and current block information can be used for the context formation of inter-layer texture prediction flag, inter-layer differential coding flag, inter-layer residual prediction flag, inter-layer combine prediction flag, inter-layer generalized residual prediction flag, and inter-layer generalized combine prediction flag. While the neighboring information and current block information can be used for context formation in the encoder side, the same neighboring information and current block information are also used for parsing process at the decoder side. Information associated with a block, such as block depth, block width, or block height can be used for context formation and parsing process. The current block may correspond to a coding unit (CU) or a prediction unit (PU). For convenience, the information related to neighboring blocks is referred to as the first information and the information related to the current block is referred to as the second information in this disclosure. The first information, second information or both the first and second information is referred to as supporting information in this disclosure.

The neighboring information may correspond to information associated with neighboring blocks of the current block. For example, the information of the upper block and the left block can be used for deriving the context for inter-layer texture prediction flag. If the inter-layer texture prediction flag of the upper block and the left block are both false, context #0 is used. If the inter-layer texture prediction flag of the upper block and the left block are both true, context #2 is used. Otherwise, the context #1 is used.

The neighboring information and current block information can also be used for parsing process. In some cases, the context corresponding to the supporting information may be sufficient to determine the inter-layer coding syntax element of the current block without explicitly transmitted information. For example, if both the left block and the upper block use inter-layer texture prediction, the inter-layer residual prediction flag can be inferred as 1. Otherwise, the inter-layer residual prediction flag is coded.

In one embodiment of using neighboring information for deriving the context for an inter-layer coding syntax element, if an upper block is not in a same Largest Coding Unit (LCU) row as the current block, context formation for the inter-layer coding syntax element only depends on information associated with the left block or the neighboring information corresponds to a predefined value.

The neighboring information is selected from a group consisting of CU depth, CU prediction type, PU partition type, prediction mode, CU size, PU size, Transform Unit (TU) size, Inter prediction direction, reference indexes, motion vectors (MVs), an indication regarding whether CU/PU/TU associated with the neighboring block(s) has residual or not, color component, inter-layer_texture_prediction_flag, inter-layer_differential_coding_flag, inter-layer_residual_prediction_flag, and any combination thereof.

When information associated with neighboring blocks is used, buffer has to be used to store the information for use by other blocks. In order to reduce the line buffer, the neighboring information can exclude the information associated with upper, upper-left, and upper-right blocks according to one embodiment of the present invention. For example, only the information of the left block is used for deriving the context for inter-layer texture prediction flag. If the inter-layer texture prediction flag of the left block is false, context #0 is used. Otherwise, context #1 is used.

In another example, the context formation of inter-layer texture prediction flag is dependent on the depth of the current block and the block corresponds to a CU. For example, the context index (ctxIdx) of inter-layer texture prediction flag can be set to min(k, current_CU_depth>>N) or min(k, (max_CU_depth−current_CU_depth)>>N), where k is 2, N is 0, current_CU_depth is the depth of the current CU, max_CU_depth is the maximum depth of CU, and >> is a logic right shift operation. The inter-layer texture prediction flag corresponds to a inter-layer coding syntax element indicating whether the current block is an inter-layer texture prediction coded block.

The context formation for coding syntax element can also be used for three-dimensional or multi-view video coding systems. Embodiments according to the present invention form context based on neighboring information and/or current block information for inter-view coding syntax elements of a current block in a dependent view. For example, the neighboring information and current block information can be used for the context formation of inter-view texture prediction flag, inter-view advanced residual prediction flag, inter-view advanced residual prediction weight index, inter-view residual prediction flag, and view synthesis prediction flag. While the neighboring information and current block information can be used for context formation in the encoder side, the same neighboring information and current block information are also used for parsing process at the decoder side. Information associated with a block, such as block depth, block width, or block height can be used for context formation and parsing process. The current block may correspond to a coding unit (CU) or a prediction unit (PU).

When information associated with neighboring blocks is used, buffer has to be used to store the information for use by other blocks. In order to reduce the line buffer, the neighboring information can exclude the information associated with upper, upper-left, and upper-right blocks according to one embodiment of the present invention. For example, only the information of the left block is used for deriving the context for the inter-view coding syntax element of a current block in a dependent view. In another example, the context formation of an inter-view coding syntax element is dependent on the depth of the current block and the block corresponds to a CU. For example, the context index (ctxIdx) of inter-view advanced residual prediction flag or inter-view advanced residual prediction weight index can be set to min(k, current_CU_depth>>N) or min(k, (max_CU_depth−current_CU_depth)>>N), where k is 2, N is 0, current_CU_depth is the depth of current CU, and max_CU_depth is the maximum depth of CU.

Another aspect of the present invention addresses Intra prediction mode coding for scalable video coding. In H.264-based SVC, the Intra prediction mode available flag of the inter-layer texture prediction coded block is 0 and the Intra prediction mode of the inter-layer texture prediction coded block is regarded as DC mode. The Intra prediction mode selection for the inter-layer texture prediction coded block as a DC mode may affect the coding efficiency. In SVC systems incorporating an embodiment of the present invention, the base layer Intra prediction modes can be used by the inter-layer texture prediction coded block.

For example, in Intra most probable mode (MPM) coding, the base layer Intra prediction mode corresponding to the neighboring block can be used for MPM derivation if the neighboring block of the current block in the current layer is inter-layer texture prediction coded block.

In another example, if a block is coded using inter-layer texture prediction, the Intra prediction mode of this block is set to the Intra prediction mode of the collocated block in the base layer. The block (a CU or a PU) may be divided into smallest units (e.g., 4×4 blocks). The Intra prediction modes of the smallest units (SUs) in this block can be different or the same. If different Intra prediction modes are used for the SUs in the block, the Intra prediction mode for each SU is set to the Intra prediction mode of the collocated SU in base layer. If the same Intra prediction mode is used for SUs in the block, the Intra prediction mode of this block is set to the Intra prediction mode of the collocated block in the base layer.

Figure 2:
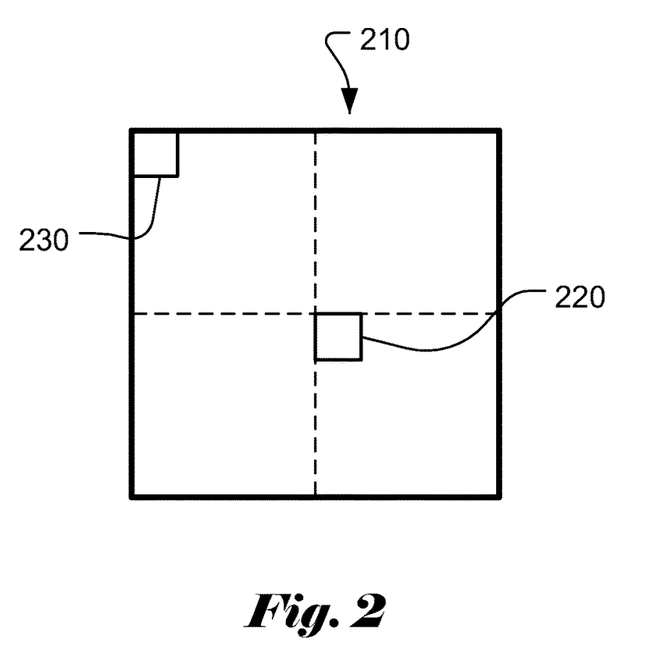
FIG. 2 illustrates an example of locating a collocated base layer block based on a collocated point, block or smallest unit (SU).

The collocated block in the base layer can be derived from a predefined point/block/SU in the current block. For example, the collocated block of the current block in the base layer corresponds to the collocated block of upper-left or center point/block/SU in base layer. FIG. 2 illustrates examples of determining collocated blocks in the base layer, where block 210 corresponds to the current block, box 220 corresponds to the center point/block/SU and box 230 corresponds to the upper-left point/block/SU.

Another aspect of the present invention addresses coefficient coding for the inter-layer texture prediction coded block. In HEVC, an inter-layer texture prediction coded block can be classified into an Intra block (i.e., using Intra prediction with the prediction mode equal to MODE_INTRA) or an Inter block (i.e., using Inter prediction with the prediction mode equal to MODE_INTER or MODE_MERGE). The coefficient coding methods for the Intra block and the Inter block are different. One major difference is that the Intra coded block does not have to code syntax element, no_residual_syntax_flag. Syntax element, no_residual_syntax_flag is used to indicate whether the block has at least one non-zero coefficient to be coded. If no_residual_syntax_flag has a value indicating no residual in the block to be coded (i.e., no non-zero coefficient), the decoder can set all the coefficients in the block as zero and skip the coefficient decoding.

The inter-layer texture prediction coded block is usually treated as an Intra-coded block in the conventional SVC system, so there is no no_residual_syntax_flag for the inter-layer texture prediction coded block. In one embodiment, the syntax element, no_residual_syntax_flag is coded for the inter-layer texture prediction coded block. For example, in Table 1, one condition (highlighted in bold Italic font) is added for no_residual_syntax_flag coding. In other words, syntax element, no_residual_syntax_flag is signally conditionally based on a condition related to the syntax element, BLPredFlag. Syntax element, BLPredFlag indicates whether the block is coded in inter-layer texture prediction.

TABLE 1

Exemplary syntax flow of general coding unit syntax

| | Descriptor |
|---|---|
| coding_unit( x0, y0, log2CbSize ) { | |
|   if( transquant_bypass_enable_flag ) { | |
|     cu_transquant_bypass_flag | ae(v) |
|   } | |
| ... ... ... | |
|   if( !pcm_flag ) { | |
|     if( (PredMode[ x0 ][ y0 ] != | |
|     MODE_INTRA \|\| *BLPredFlag[x0][y0]*) && | |
|       !(PartMode == PART_2Nx2N && | |
|       merge_flag[x0][y0]) ) | |
|       no_residual_syntax_flag | ae(v) |
|     if( !no_residual_syntax_flag ) { | |
|       MaxTrafoDepth = ( PredMode[ x0 ][ y0 ] == | |
|       MODE_INTRA ? | |
|         max_transform_hierarchy_depth_intra + | |
|         IntraSplitFlag : | |
|         max_transform_hierarchy_depth_inter ) | |
|       transform_tree( x0, y0 x0, y0, | |
|       log2CbSize, 0, 0 ) | |
|     } | |
|   } | |
| } | |

Figure 3:
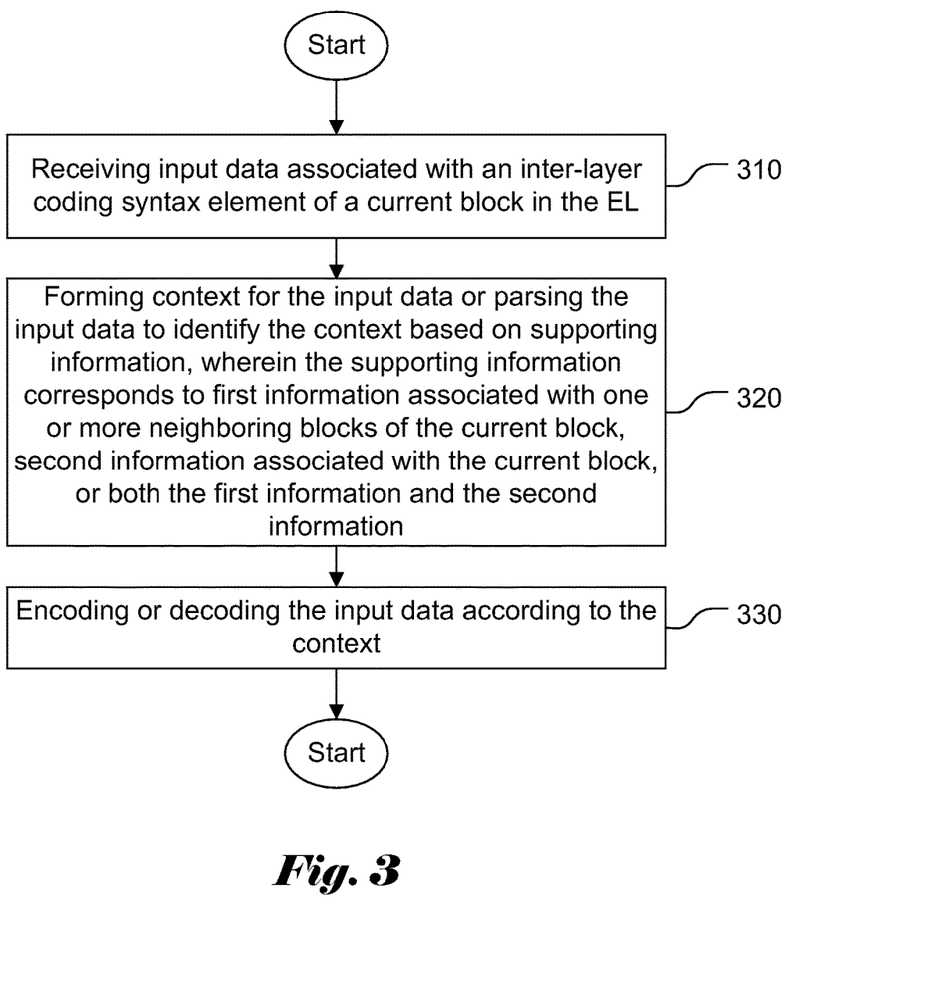
FIG. 3 illustrates an exemplary flowchart of a scalable video coding system according to an embodiment of the present invention, where context formation is used for encoding or decoding of the inter-layer coding syntax element.

FIG. 3 illustrates an exemplary flowchart of a scalable video encoding or decoding system incorporating an embodiment of the present invention, wherein the video data is configured into a Base Layer (BL) and an Enhancement Layer (EL), and the EL has higher spatial resolution or better video quality than the BL. The system receives input data associated with an inter-layer coding syntax element of a current block in the EL as shown in step 310. For encoding, the input data corresponds to the inter-layer coding syntax element of the current block in the EL to be coded. For decoding, the input data corresponds to the coded inter-layer coding syntax element associated with the current block to be parsed and decoded. The input data may be retrieved from storage such as a computer memory, buffer (RAM or DRAM) or other media. The input data may also be received from a processor such as a controller, a central processing unit, a digital signal processor or electronic circuits that produce the input data. The context for the input data is formed or the input data is parsed to identify the context based on supporting information as shown in step 320, wherein the supporting information corresponds to first information associated with one or more neighboring blocks of the current block, second information associated with the current block, or both the first information and the second information. The input data is then encoded or decoded according to the context in step 330.

Figure 4:
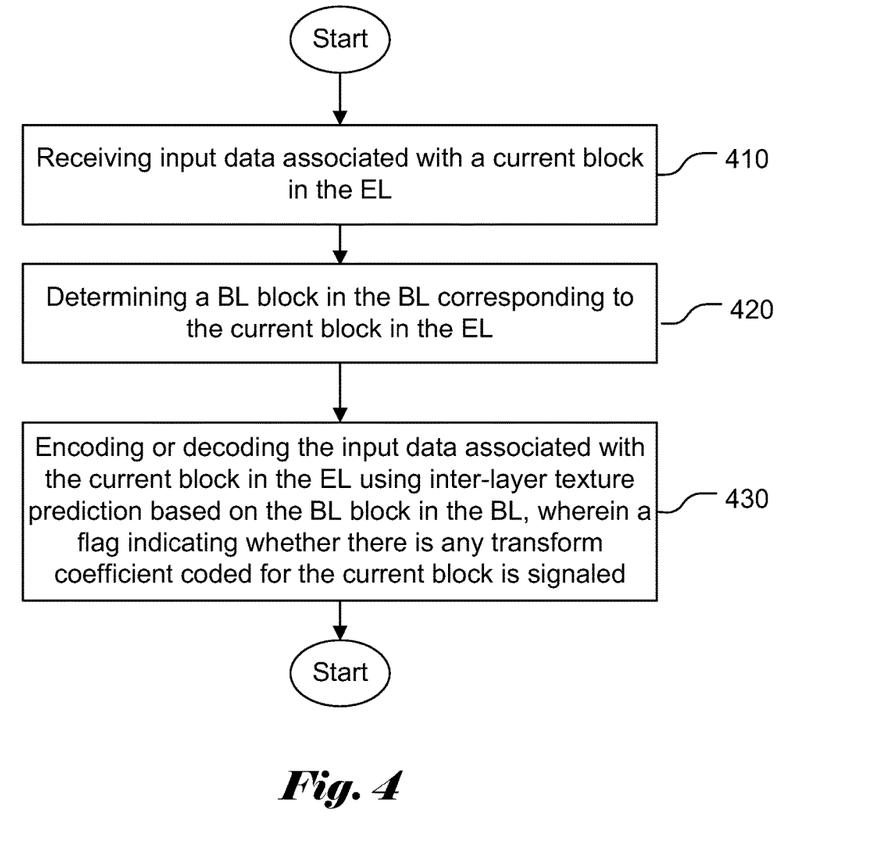
FIG. 4 illustrates an exemplary flowchart of a scalable video coding system according to yet another embodiment of the present invention, where coefficient coding for an enhance layer block can be based on Inter prediction or Intra prediction.

FIG. 4 illustrates an exemplary flowchart of a scalable video encoding or decoding system incorporating yet another embodiment of the present invention. The system receives input data associated a current block in the EL as shown in step 410. A BL block in the BL corresponding to the current block in the EL is determined as shown in step 420. The input data is then encoded or decoded using inter layer texture prediction based on the BL block in the BL as shown in step 430, wherein a flag indicating whether there is any transform coefficient coded for the current block is signaled.

Figure 5:
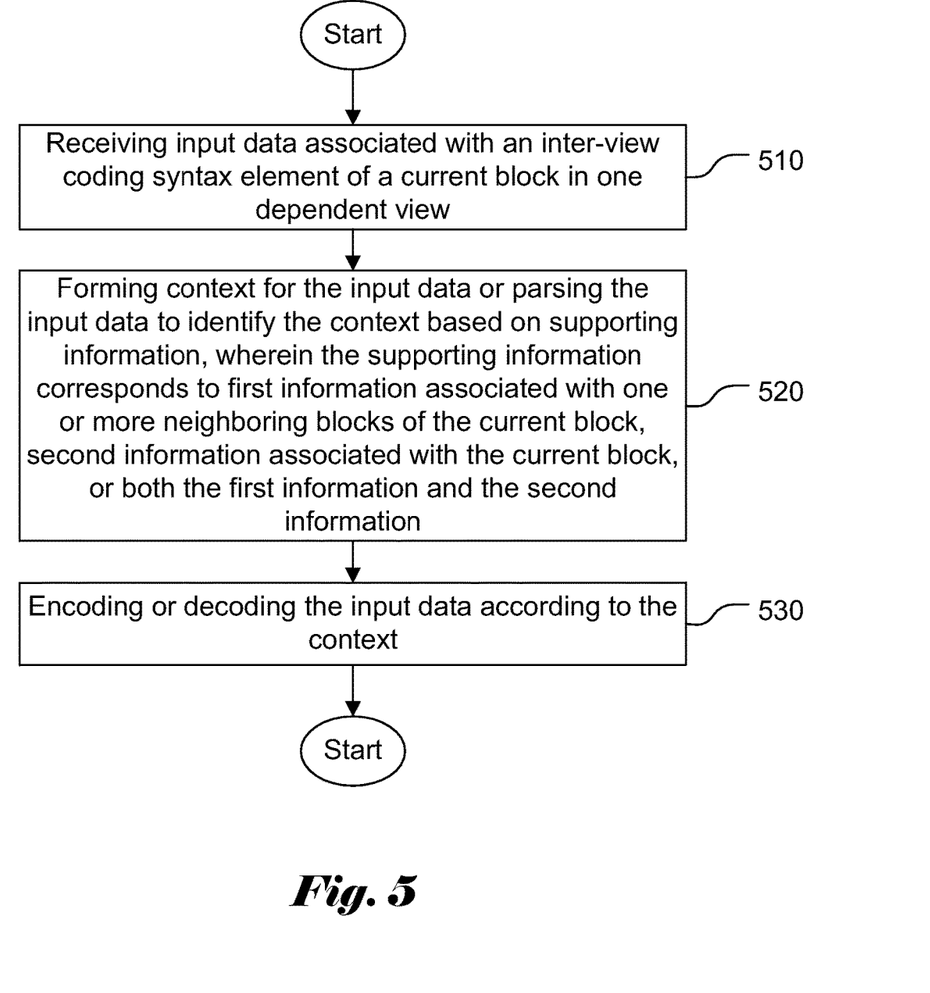
FIG. 5 illustrates an exemplary flowchart of a three-dimensional or multi-view video coding system according to an embodiment of the present invention, where context formation is used for encoding or decoding of the inter-view coding syntax element.

FIG. 5 illustrates an exemplary flowchart of a three-dimensional or multi-view video encoding or decoding system incorporating an embodiment of the present invention. The system receives input data associated with an inter-view coding syntax element of a current block in the one dependent view as shown in step 510. The context for the input data is formed or the input data is parsed to identify the context based on supporting information as shown in step 520, wherein the supporting information corresponds to first information associated with one or more neighboring blocks of the current block, second information associated with the current block, or both the first information and the second information. The input data is then encoded or decoded according to the context in step 530. In some embodiments of the three-dimensional or multi-view video encoding or decoding system, the first information in step 520 is selected from a group consisting of Coding Unit (CU) depth, CU prediction type, Prediction Unit (PU) partition type, prediction mode, CU size, PU size, Transform Unit (TU) size, Inter prediction direction, reference indexes, motion vectors (MVs), an indication regarding whether CU/PU/TU associated with said one or more neighboring blocks has residual or not, color component, inter-view coding syntax element including inter-view texture prediction flag, inter-view advanced residual prediction flag, inter-view advanced residual prediction weight index, iv_res_pred_weight_idx, iv_res_pred_weight_flag, and any combination thereof.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of coding video data in a scalable video coding system, wherein the video data is configured into a Base Layer (BL) and an Enhancement Layer (EL), and the EL has higher spatial resolution or better video quality than the BL, the method comprising:
   receiving input data associated with an inter-layer coding syntax element of a current block in the EL;
   forming context for the input data or parsing the input data to identify the context based on supporting information, wherein the supporting information corresponds to first information associated with one or more neighboring blocks of the current block, second information associated with the current block, or both the first information and the second information; and
   encoding or decoding the input data according to the context,
   wherein forming context for the input data or parsing the input data to identify the context based on supporting information comprises:
     when an upper block of the current block is in a same Largest Coding Unit (LCU) row as the current block, the one or more neighboring blocks comprise the upper block and a left block of the current block; and
     when the upper block is not in the same LCU row as the current block, the first information only includes the first information associated with the left block or the first information corresponds to a predefined value.

2. The method of claim 1, wherein the inter-layer coding syntax element is selected from a group consisting of inter-layer_texture_prediction_flag, inter-layer_differential_coding_flag, interlayer_residual_prediction_flag, inter-layer_combine prediction flag, interlayer_generalized residual_prediction_flag, and inter-layer_generalized_combine_prediction_flag.

3. The method of claim 1, wherein said one or more neighboring blocks comprises a left block of the current block and no upper block of the current block.

4. The method of claim 1, wherein the second information associated with the current block comprises depth, block width, or block height of the current block, or any combination thereof.

5. The method of claim 1, wherein the inter-layer coding syntax element is inferred during said parsing the input data if the context corresponding to the supporting information is able to determine inter-layer coding syntax element.

6. The method of claim 1, wherein the context for the inter-layer_texture prediction_flag of the current block corresponds to min(k,current_CU_depth>>N) or ((max_CU_ depth-current_CU_depth)>>N), wherein the inter-layer_texture_prediction_flag corresponds to the interlayer coding syntax element indicating whether the current block is an inter-layer texture prediction coded block, the current_CU_depth corresponds to depth of the current block, max_CU_depth corresponds to maximum depth of the current block, k and N are integers, and ">>" corresponds to logic right shift operation.

7. The method of claim 6, wherein k is 2 and N is 0.

8. The method of claim 1, wherein the first information is selected from a group consisting of Coding Unit (CU) depth, CU prediction type, Prediction Unit (PU) partition type, prediction mode, CU size, PU size, Transform Unit (TU) size, Inter prediction direction, reference indexes, MVs, an indication regarding whether CU/PU/TU associated with said one or more neighboring blocks has residual or not, color component, inter-layer_texture_prediction_flag, inter-layer_differential_coding_flag, inter-layer residual_prediction flag, and any combination thereof.

9. A method of coding video data in a scalable video coding system, wherein the video data is configured into a Base Layer (BL) and an Enhancement Layer (EL), and the EL has higher spatial resolution or better video quality than the BL, the method comprising:

receiving input data associated with a current block in the EL;

determining a BL block in the BL corresponding to the current block in the EL; and encoding or decoding the input data associated with the current block in the EL using inter layer texture prediction based on the BL block in the BL, wherein a flag indicating whether any transform coefficient coded for the current block is signaled, wherein the flag indicating whether any transform coefficient coded for the current block is signaled based on a second flag indicating whether the current block is coded in inter-layer texture prediction.

10. The method of claim 9, wherein said decoding the input data associated with the current block in the EL using inter-layer texture prediction further comprises setting all transform coefficients in the current block as zero and skipping decoding the transform coefficients of the current block.

11. A method for three-dimensional video coding or multi-view video coding, where video data is configured to one base view and one or more dependent views, the method comprising:

receiving input data associated with an inter-view coding syntax element of a current block in one dependent view;

forming context for the input data or parsing the input data to identify the context based on supporting information, wherein the supporting information corresponds to first information associated with one or more neighboring blocks of the current block, second information associated with the current block, or both the first information and the second information; and encoding or decoding the input data according to the context, wherein forming context for the input data or parsing the input data to identify the context based on supporting information comprises:

when an upper block of the current block is in a same Largest Coding Unit (LCU) row as the current block, the one or more neighboring blocks comprise the upper block and a left block of the current block; and when the upper block is not in the same LCU row as the current block, the first information only includes the first information associated with the left block or the first information corresponds to a predefined value.

12. The method of claim 11, wherein the inter-view coding syntax element is selected from a 30 group consisting of inter-view texture prediction flag, inter-view advanced residual prediction flag, inter-view advanced residual prediction weight index, iv_res_pred_weight_idx (inter-view residual prediction weight index), iv_res_pred_weight_flag (inter-view residual prediction flag), and view synthesis prediction flag.

13. The method of claim 11, wherein said one or more neighboring blocks comprises a left block of the current block and no upper block of the current block.

14. The method of claim 11, wherein the context for the inter-view coding syntax element of the current block is based on the inter-view coding syntax element associated with an upper block and a left block of the current block or based on the inter-view coding syntax element associated with the left block of the current block only.

15. The method of claim 11, wherein the second information associated with the current block comprises depth, block width, or block height of the current block, or any combination thereof.

16. The method of claim 11, wherein the context for inter-view advanced residual prediction flag or inter-view advanced residual prediction weight index of the current block corresponds to min(k,current_CU_depth>>N) or ((max_CU_depth−current_CU_depth)>>N), wherein the interview advanced residual prediction flag or inter-view advanced residual prediction weight index corresponds to the inter-view coding syntax element indicating whether the current block is using inter-view advanced residual prediction, the current_CU_depth corresponds to depth of the current block, max_CU_depth corresponds to maximum depth of the current block, k and N are integers, and ">>" corresponds to logic right shift operation.

17. The method of claim 11, wherein the first information is selected from a group consisting of Coding Unit (CU) depth, CU prediction type, Prediction Unit (PU) partition type, prediction mode, CU size, PU size, Transform Unit (TU) size, Inter prediction direction, reference indexes, motion vectors (MV s), an indication regarding whether CU/PU/TU associated with said one or more neighboring blocks has residual or not, color component, one inter-view coding syntax element including the inter-view texture prediction flag, inter-view advanced residual prediction flag, inter-view advanced residual prediction weight index, iv_res_pred_weight_idx, iv_res_pred_weight_flag, and any combination thereof.

18. The method of claim 1, wherein the context for an inter-layer_texture_prediction_flag of the current block is based on an inter-layer_texture prediction_flag associated with an upper block of the current block and a left block of the current block, or based on the inter-layer_texture_prediction_flag associated with the left block of the current block only.

19. The method of claim 11, wherein the context for an inter-layer_texture_prediction_flag of the current block is based on an inter-layer_texture prediction_flag associated with an upper block of the current block and a left block of the current block, or based on the inter-layer_texture_prediction_flag associated with the left block of the current block only.

* * * * *